United States Patent [19]

McCoy et al.

[11] Patent Number: 4,838,350
[45] Date of Patent: Jun. 13, 1989

[54] GRAVITY STABLE SURFACTANT FLOODING IN GAS DEPLETED RESERVOIRS

[75] Inventors: Kevin P. McCoy, Calgary, Canada; George P. Kokolis, Houston, Tex.

[73] Assignees: Texaco Inc., White Plains, N.Y.; Texaco Canada Resources, Alberta, Canada

[21] Appl. No.: 137,992

[22] Filed: Dec. 28, 1987

[51] Int. Cl.$^4$ ............................................. E21B 43/22
[52] U.S. Cl. .................................... 166/274; 166/268; 166/275
[58] Field of Search ......... 166/252, 268, 269, 273–275

[56] References Cited

U.S. PATENT DOCUMENTS

| | | | |
|---|---|---|---|
| 1,651,311 | 11/1927 | Atkinson | 166/275 |
| 3,215,198 | 11/1965 | Willman | 166/268 X |
| 3,363,684 | 1/1968 | Miller | 166/275 |
| 3,455,385 | 7/1969 | Gogarty | 166/274 |
| 3,455,389 | 7/1969 | Gogarty | 166/274 |
| 3,495,661 | 2/1970 | Gogarty | 166/274 |
| 3,519,076 | 7/1970 | Walker | 166/263 |
| 4,140,182 | 2/1979 | Vriend | 166/274 X |
| 4,393,936 | 7/1983 | Josendal | 166/268 X |

Primary Examiner—George A. Suchfield
Attorney, Agent, or Firm—Jack H. Park; Kenneth R. Priem; Harold J. Delhommer

[57] ABSTRACT

The invention is a method of recovering hydrocarbons from an underground vertical hydrocarbon reservoir having a substantial vertical thickness, an oil saturation relatively near residual oil saturation to gas, and at least one injection well and one production well penetrating the reservoir. The method comprises injecting a surfactant slug into the bottom of the reservoir above any water zone or aquifer, and driving the surfactant slug upwards through the reservoir by the use of some driving force. The driving force may be supplied by one or more of a combination of methods comprising producing the gas cap of the reservoir, producing hydrocarbons banked above the surfactant slug, or injecting fluid below the surfactant slug. Hydrocarbons are recovered at one or more production wells.

13 Claims, 1 Drawing Sheet

GRAVITY STABLE SURFACTANT FLOODING IN GAS DEPLETED RESERVOIRS

BACKGROUND OF THE INVENTION

This invention is concerned with gravity stable surfactant flooding, particularly in vertical reservoirs which have been depleted by gas drive or gas expansion recovery methods.

Many different enhanced oil recovery techniques have been suggested over the years. Quite a few of these methods have been tried in the field with varying results. One of the more successful techniques, particularly in vertical reef reservoirs, has been the use of a gas drive to push hydrocarbons through a formation. Such methods leave an oil saturation in the swept portion of the reservoir at or near residual oil saturation to gas. The majority of mobile fluid in place is gas.

Some substantially vertical reservoirs, such as the vertical reef reservoirs in Western Canada have been subjected to a miscible flooding technique referred to as miscible blanket flooding. This is a vertically downward moving flood which is especially suitable for use in thick reservoirs having a vertical thickness in excess of 50 feet or more.

In miscible blanket flooding, a solvent is injected into the upper portion of the reservoir. After the injection of a predetermined volume of solvent which is sufficient to form a thin layer or blanket on top of the oil saturated portion of the formation, a drive fluid is injected into the upper portion of the formation to displace the slug or blanket of solvent vertically downward. Ideally, vertical miscible blanket flooding contemplates the establishment of a discreet, relatively thin layer of solvent which is spread completely across the top of the formation. U.S. Pat. Nos. 3,850,243 and 4,249,607, and Canadian Pat. Nos. 1,227,419 and 1,227,420 describe such processes.

U.S. Pat. No. 3,455,389 discloses a surfactant flooding scheme in a dipping reservoir with a water drive. In this secondary recovery method, a surfactant slug is injected at the interface between the aquifer and the formation hydrocarbons. U.S. Pat. No. 4,372,381 discloses the injection of a hydrocarbon solvent slug in a dipping reservoir between an aquifer and formation fluids.

Another injection and production process for a dipping reservoir having water and gas zones is disclosed in U.S. Pat. No. 3,519,076. This reference teaches the injection of water into the water zone to move the water zone upwards, driving hydrocarbons to a production well. After the water zone has moved to shut off oil production from the production well, the production well is converted to gas injection and oil is produced from another production well.

SUMMARY OF THE INVENTION

The invention is a tertiary method of recovering hydrocarbons from an underground vertical hydrocarbon reservoir having a substantial vertical thickness, an oil saturation relatively near residual oil saturation to gas, and at least one injection well and one production well penetrating the reservoir. The method comprises injecting a surfactant slug into the bottom of the reservoir above any water zone or aquifer, and driving the surfactant slug upwards through the reservoir by the use of some driving force. The driving force may be supplied by one or more of a combination of methods comprising producing the gas cap of the reservoir, producing hydrocarbons banked above the surfactant slug, or injecting fluid below the surfactant slug. Hydrocarbons are recovered at one or more production wells.

DETAILED DESCRIPTION

Figure 1:
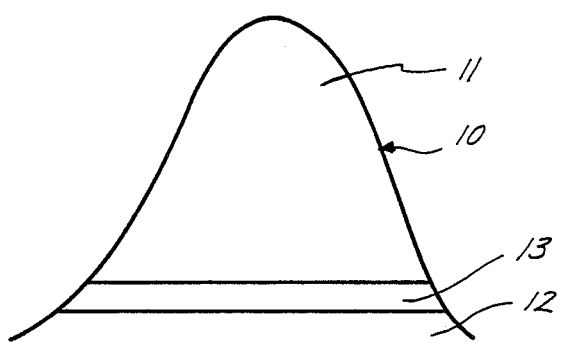
FIG. 1 is a diagram illustrating a dome-shaped vertical reservoir with a gas flushed zone and an underlying aquifer after the injection of a surfactant slug at the bottom of the reservoir above the aquifer.

The invention is concerned with an improvement in surfactant flooding technology wherein a surfactant slug is displaced upward in a vertical direction to recover hydrocarbons from a reservoir wherein the oil saturation is relatively near the residual oil saturation to gas. Such an oil saturation exists in reservoirs which have been depleted by means of a gas drive or gas expansion recovery method. The majority of mobile fluid in place of the reservoir is gas. By driving a surfactant slug in a vertically upward direction, the residual oil may be banked above the surfactant slug and later recovered.

The tertiary invention process is applicable to vertical reservoirs which have an oil saturation near residual oil saturation to gas and which have a substantial vertical thickness. It is especially suitable for use in thick reservoirs having a vertical thickness in excess of 50 feet or more.

The invention is practiced by injecting a surfactant slug into the bottom of the reservoir above any waterflooded zone or underlying aquifer. The reservoir will preferably be a vertical reef reservoir, or a reservoir having vertical fault lines or some type of countervailing pressure which will limit the horizontal spread of the surfactant slug when it is driven in a substantially upward direction through the reservoir. Sufficient surfactant is injected to form a thin layer or blanket at the bottom of the reservoir and on top of any underlying water zone. The surfactant slug should have a sufficient thickness to enable the surfactant slug to maintain its integrity as it is driven upward through the formation.

One or more of a number of driving forces may be employed to drive the surfactant slug upwards through the reservoir. Producing the gas cap or gas flushed zone of the reservoir is one method of driving the surfactant slug upwards through the reservoir. This method is particularly effective if the reservoir has an underlying aquifer of sufficient strength to replace the lost voidage, and drive the surfactant bank upward through the reservoir. This could be done as a part of the normal blow-down phase of reservoir production.

Hydrocarbons that are banked above the surfactant slug may be produced to create a voidage which the surfactant slug will attempt to fill, particularly if there is a strong underlying aquifer. But such a method is difficult to employ unless there is a sufficiently thick oil bank above the surfactant slug to produce from. Otherwise, coning of the surfactant slug will occur through the oil bank towards a point of production.

Furthermore, it is believed that the invention method may be more effective in ultimately producing a larger amount of oil if production of the oil bank is delayed until the oil bank has swept through most of the gas-flushed zone of the reservoir. The oil bank above the surfactant slug may aid the surfactant slug in lowering the mobile gas saturation and sweeping the residual oil in front of it.

Another method of driving the surfactant slug upwards through the reservoir is to inject fluid below the surfactant slug. This may be done by injecting water into an underlying aquifer which communicates with the reservoir to drive the surfactant slug upward. A second method of injecting fluid is to inject a drive fluid below the surfactant slug and above any underlying aquifer or waterflooded zone. Preferably, such a drive fluid will be compatible with the surfactant slug and will contain a viscosity increasing polymer.

To further insure that the surfactant slug will maintain its integrity and remain above an underlying aquifer or underlying drive fluid, the surfactant slug may be prepared with a lower specific gravity than the aquifer fluid or any water zone lying below the surfactant slug. One method of accomplishing this is to prepare the surfactant slug with a lower salinity than any underlying water. This will help to insure the separation of the fluids.

A frequent problem with surfactant flooding is the loss of surfactants due to absorption and adsorption on the formation matrix. In this gravity stable vertical flooding method, an additional surfactant can be easily injected into the formation and added to the surfactant slug or bank as needed after the surfactant slug has been driven upwards through the reservoir.

Whatever the method used to move the surfactant slug upwards through the vertical reservoir, a more efficient sweep of the reservoir and higher overall production can be achieved if the rate of advance or displacement velocity of all phases or front flowing in the reservoir does not exceed critical velocity for those phases. This includes the rate of advance of the surfactant slug, the oil bank mobilized above the surfactant slug and the driving fluid below the surfactant slug. The optimum displacement velocity for the surfactant flood should be the minimum of the calculated critical velocities for the different advancing fronts discussed above. In most cases, this will be the critical velocity of the surfactant front.

The critical velocity of a flooding medium at its interface is the highest velocity which the flood medium can move through the formation while maintaining its integrity and not fingering through the medium being swept in advance of the front. At speeds greater than critical velocity, inefficient flooding and lower oil recovery will result. However, a flood may be planned to exceed critical velocity at certain times in an effort to balance the gain of a shorter flooding time versus the loss of production.

The concept of critical velocity and the equations for calculating it are well known in the art. Please see U.S. Pat. Nos. 3,811,503; 3,878,892; 4,136,738; 4,299,286; 4,418,753; 4,434,852 and 4,653,583, the disclosures of which are incorporated herein by reference.

The critical velocity of a flooding medium at its interface with the oil saturation zone can be estimated by the critical velocity equation.

$$V_c = \frac{2.741 k_o \Delta\rho}{\phi \Delta\mu (1 - S_{or} - S_{wir})}$$

where
$V_c$ = critical velocity in ft/day,
$k_o$ = oil permeability in darcies,
$\Delta\rho$ = density difference between the underground hydrocarbons and the fluid medium in g/cc,
$\Delta\mu$ = viscosity difference between the underground hydrocarbons and the fluid medium in cP,
$S_{or}$ = residual oil saturation in fraction,
$S_{wir}$ = irreducible water saturation in fraction, and
$\phi$ = porosity of the formation in fraction.

Where there is no significant mobile water saturation, the critical velocity equation can be simplified. In such a case the term $(1 - S_{or} - S_{wir}) = S_o$, where $S_o$ equals the oil saturation difference between the portion of the formation swept by the fluid medium and the portion of the formation to be swept by the fluid medium in fraction.

To minmimize the loss of potentially recoverable oil, it may be preferable to delay complete oil production until after the leading edge of the oil bank has passed through most of the previously gas-flushed regions of the reservoir. The location of the leading edge of the oil bank and surfactant slug may be determined roughly by calculation. Small production from a specified depth in a well penetrating the formation is another method to determine whether or not the leading edge of the oil bank and leading edge of the surfactant slug has passed through a particular point. But the preferred means of determining the location of the oil bank and surfactant slug is to run one of several different types of logs known to those skilled in the art thorugh a well at relevant depths.

It is possible to determine the location of the interface between the oil bank and the gas-flushed zone by the use of a neutrol lifetime log or a carbon/oxygen ratio log. Both of these logs measure density differences between the two layers. If there is a relatively small difference in density between the two regions, multiple runs can be made and averaged to yield the location of the oil bank and surfactant slug.

The composition of the surfactant slug may be optimized in a manner known to those skilled in the art. Although a single surfactant may be used, most surfactant slugs are comprised of multiple surfactants and other compounds. It is well known that conventional surfactant flooding mixtures are usually composed of one or more petroleum, petrochemical or synthetic sulfonates, a solubilizer or co-surfactant, brine and, optionally, a quantity of hydrocarbon. These components are normally combined to make a surfactant system.

The surfactant system is conventionally injected into a reservoir to form a front followed by the injection of additional brine or water which may contain a mobility control agent. The surfactant system is usually injected as a slug having about 10% to 20% of the pore volume of the reservoir with a total surfactant and solubilizer concentration of about 0.1% to about 10%, preferably about 0.1% to about 5% by weight. A typical surfactant system may be:

1. one or more petroleum sulfonates such as
   (a) a water soluble sulfonate having a relatively low equivalent weight, and (b) an oil soluble sulfonate having a relatively high equivalent weight, or (c) any other commercially available petroleum sulfonates.;

2. a solubilizer or co-surfactant;

3. brine; and 4. optionally, a light hydrocarbon.

As mentioned before, surfactant flooding systems can be formulated under some conditions without a solubilizer and with only a sole surfactant. Petrochemical and synthetic sulfonates may be substituted for petroleum sulfonates. The surfactant slug may also contain or be preceded by a sacrificial agent.

Surfactant systems are generally pushed through the formation towards a production well by the subsequent injection of a drive fluid. The drive fluid is usually water, gas, or water viscosified by a polymer. Hydrocarbons and other polymers are then recovered at one or more production wells.

Figure 2:
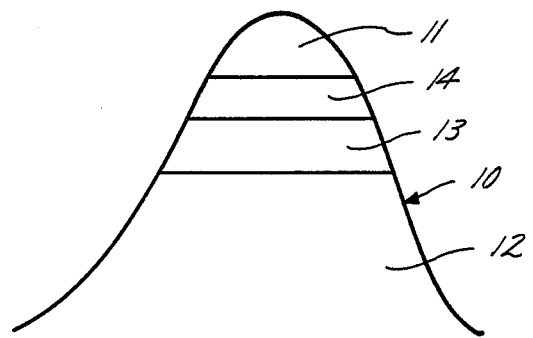
FIG. 2 illustrates the dome-shaped reservoir of FIG. 1 wherein an oil bank has been created above the surfactant slug as the surfactant slug has been driven upwards through the reservoir.
Figure 3:
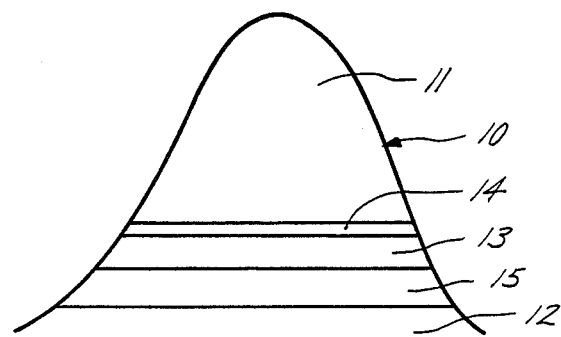
FIG. 3 illustrates the dome-shaped reservoir of FIG. 1 when a drive fluid has been injected below the surfactant slug and above the aquifer.

FIGS. 1, 2 and 3 illustrate a vertical reef reservoir at various times in the practice of the surfactant flood of the present invention. The gravity stable nature of the upward surfactant displacement leads to excellent displacement efficiency. The bank should evenly sweep the reservoir in a piston-like fashion. A distinct advantage exists to flooding upwards in a vertical reef reservoir, such as illustrated in FIGS. 1-3. Generally, such reservoirs have much greater areal extent at lower depths. This leads to both the surfactant and oil banks becoming thicker at later times during the flood as they move through higher elevations. Thicker banks are more easily produced and more likely to maintain their integrity.

FIGS. 1-3 illustrate a vertical reef reservoir 10 having a gas-flushed zone 11, underlying aquifer 12 and injected surfactant slug 13 lying between the gas-flushed zone 11 and aquifer 12. FIG. 1 illustrates the reservoir immediately after the injection of the surfactant slug 13. FIG. 2 illustrates the reservoir after the aquifer 12 has driven the surfactant slug upwards through most of the reservoir to create an oil bank 14, which may be produced. FIG. 3 illustrates the reservoir in an embodiment wherein a drive fluid 15 has been injected into the reservoir below the surfactant slug 13 and above the aquifer 12. This drive fluid 15 has driven the surfactant slug 13 upwards through the reservoir creating oil bank 14.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method of recovering hydrocarbons from an underground vertical hydrocarbon reservoir having a substantial vertical thickness, and at least one injection well and at least one production well penetrating the reservoir, which comprises:

injecting a surfactant slug through an injection well into the bottom of a vertical reservoir above any water zone, said vertical reservoir having a gas cap and an oil saturation relatively near residual oil saturation to gas;

driving the surfactant slug upwards through the vertical reservoir by producing the gas cap of the reservoir, producing hydrocarbons banked above the surfactant slug or injecting fluid below the surfactant slug; and recovering hydrocarbons at the production well.

2. The method of claim 1, further comprising driving the surfactant slug upwards through the reservoir by both producing the gas cap and by injecting fluid below the surfactant slug.

3. The method of claim 1, wherein the fluid injected below the surfactant slug is a drive fluid comprised of water, gas, or water viscosified by a polymer.

4. The method of claim 3, wherein the surfactant slug has a lower specific gravity than the drive fluid.

5. The method of claim 1, wherein the reservoir communicates with an underlying aquifer.

6. The method of claim 5, wherein the fluid injected below the surfactant slug is water injected into the aquifer.

7. The method of claim 5, wherein the surfactant slug has a lower salinity than the aquifer.

8. The method of claim 1, wherein the reservoir is a vertical reef reservoir.

9. The method of claim 1, wherein the surfactant slug contains multiple surfactants.

10. The method of claim 1, wherein the surfactant slug has a lower salinity than any water zone below the surfactant slug.

11. The method of claim 1, further comprising the injection of additional surfactant into the surfactant slug after the surfactant slug has been driven upwards through the reservoir.

12. The method of claim 1, wherein the surfactant slug is driven upwards through the reservoir at a displacement velocity not exceeding critical velocity.

13. A method of recovering hydrocarbons from an underground vertical reef reservoir having a substantial vertical thickness, and at least one injection well and at least one production well penetrating the reservoir, which comprises:

injecting a surfactant slug through an injection well into the bottom of a vertical reservoir above any water zone, said vertical reservoir having a gas cap and an oil saturation relatively near residual oil saturation to gas;

driving the surfactant slug upwards through the vertical reservoir by producing the gas cap of the reservoir and by injecting water below the surfactant slug, said surfactant slug having an upwards displacement velocity equal to or less than critical velocity; and recovering hydrocarbons at the production well.

* * * * *